Apr. 3, 1923.

H. C. FORD 1,450,585

RANGE AND BEARING KEEPER

Filed June 19, 1918    4 sheets-sheet 1

INVENTOR
Hannibal C. Ford
BY
Henry Markley
ATTORNEY

Apr. 3, 1923.　　　　　　　　　　　　　　　　　　1,450,585
H. C. FORD
RANGE AND BEARING KEEPER
Filed June 19, 1918　　　　　　4 sheets-sheet 2

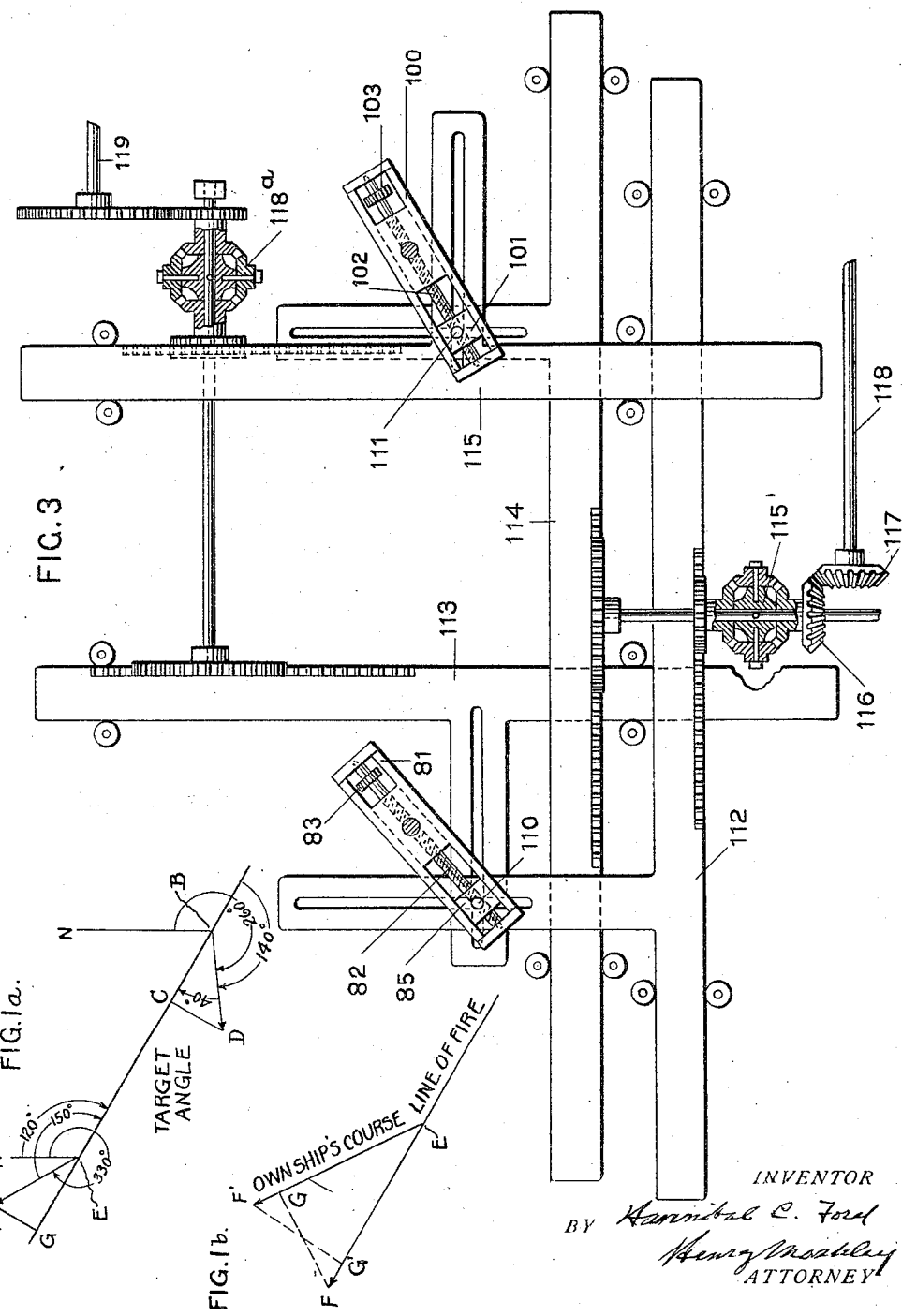

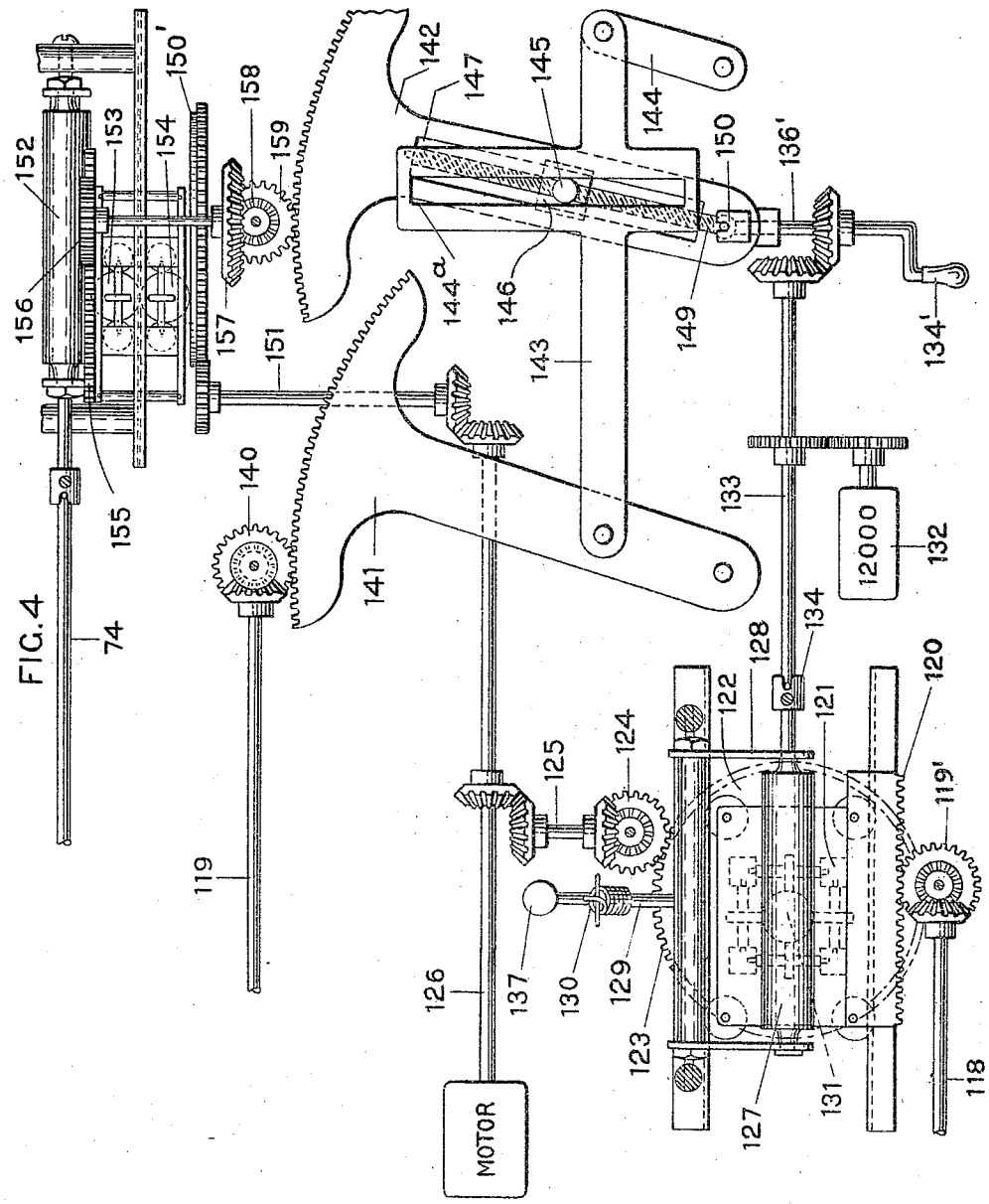

Patented Apr. 3, 1923.

1,450,585

UNITED STATES PATENT OFFICE.

HANNIBAL C. FORD, OF JAMAICA, NEW YORK, ASSIGNOR TO FORD INSTRUMENT COMPANY, INC., OF NEW YORK, N. Y., A CORPORATION OF NEW YORK.

RANGE AND BEARING KEEPER.

Application filed June 19, 1918. Serial No. 240,883.

*To all whom it may concern:*

Be it known that I, HANNIBAL C. FORD, a citizen of the United States, residing at Jamaica, in the borough of Queens, State of New York, have invented new and useful Improvements in Range and Bearing Keepers, of which the following is a specification.

This invention relates to range keepers or instruments for automatically and continuously indicating the range and bearing existing between two relatively moving objects if the speeds and courses of the two objects have been determined.

The invention is particularly adapted for naval use, where it is desired to obtain the range and bearing between two relatively moving ships.

One object of the invention is to provide an instrument for indicating the true courses of both ships and the true target's bearing or line of fire, as well as the relative bearing of the target relative to own ship, and the target's bearing with respect to own ship. It its also an object to provide proper mechanism for indicating the angle which the target makes with the line of fire.

A further object of the invention is to provide differential gearing between the different dials or other indicating mechanisms for giving the courses, target's bearing, etc. which gearing is so constructed that the several indicating mechanisms will each be moved in their proper relation to the others when one of the mechanisms is shifted.

A further object of the invention is to provide in conjunction with indicating mechanisms consisting of dials, pointers and the like, means for deriving mechanically, the components of the speed of own ship and of the target along the line of fire and at right angles thereto respectively, which components are thereafterwards added or subtracted and utilized to mechanically give the range rate and deflection.

It is also an object of the invention to provide means for deriving mechanically, components of the target's course and speed and of own ship's course and speed by providing a mechanical vector whose direction corresponds to the target's course and whose lengths depend upon the target's speed and a second mechanical vector, whose direction corresponds to the own ship's bearing and whose length corresponds to speed of own ship.

A further object of the invention is to provide a simple mechanism for generating the bearing from the deflection.

A further object of the invention is to provide an improved mechanism for changing the angular direction and length of each of the mechanical vectors.

Other objects of the invention will be apparent from the detailed description hereinafter to follow, when taken in conjunction with the accompanying drawings and will be more particularly pointed out in the appended claims. For the sake of clearness, the drawings are somewhat diagrammatic.

Fig. 1 shows a plan of an instrument constructed in accordance with the principles of the invention, parts being shown in section.

Fig. 1$^A$ is a vector diagram of the problem shown by the dials in Fig. 1.

Fig. 1$^B$ is a diagram illustrating the equality between the components derived from vectors laid out along the line of fire and along own ship course.

Figure 3 is a plan showing the mechanical vectors and mechanism for resolving them into their components, and Figure 4 shows the mechanism for automatically generating the target's bearing and range.

Figure 1:
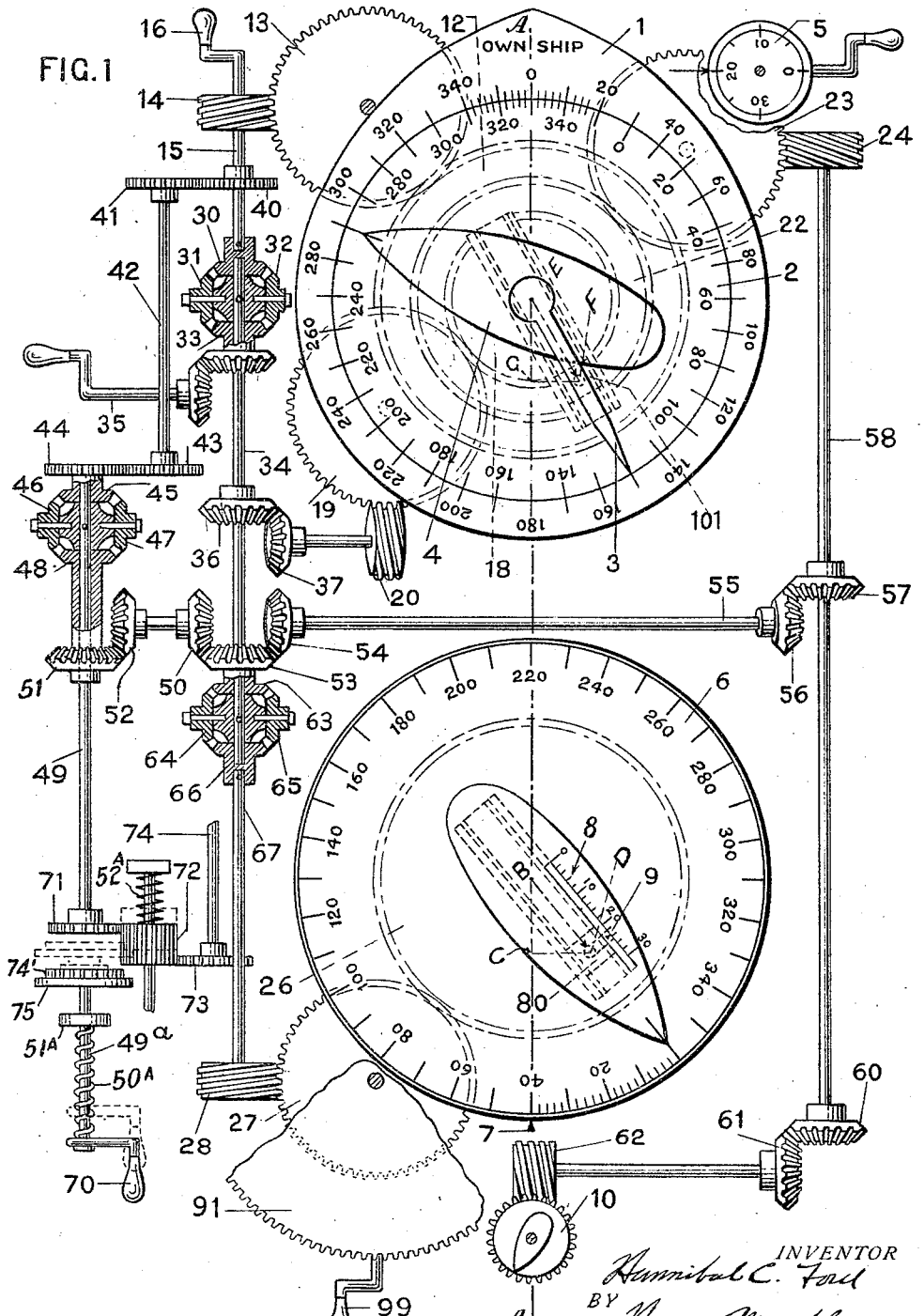

Referring first to Fig. 1, a preferred arrangement of dials is shown consisting of a ring or annular dial 1 which will be hereinafter designated "relative bearing dial," which when the instrument is set up upon a ship, is arranged so that its zero line defines the fore and aft line of the ship. The dial is provided with an azimuth scale and surrounds a compass dial 2 which is also provided with an azimuth scale. A pointer 3 which is mounted co-incidently with the center of compass dial 2, swings thereover and is utilized to indicate the target's bearing. The true target's bearing is read on the compass dial 2 opposite the end of the pointer as for example, as shown in the drawing, the true target's bearing is 120°. The relative target's bearing or the angle between own ship and the line of fire, is read off the dial 1 and is shown as 150°, The true course of own ship is read from the compass dial 2 opposite the zero on the relative bearing dial 1 and is shown as 330°.

Also mounted co-incidently with the pointer 3 of dial 2 is a pointer 4 which is utilized to indicate the direction or course of the target, the true course being read from the compass dial 2 opposite the end of the pointer and is shown as 260°, and the relative course i. e., the angle between own ship and the target is read from the relative bearing dial 1, and is shown to be 290°. A small dial 5 is used to indicate the speed of own ship which is set up in the instrument, as will be later described.

A dial 6 which will be hereinafter called the "target dial" has an azimuth scale, and the angle which the target makes with the target's bearing or the line of fire, is read off the scale opposite the lubber's line 7 and is shown as 40°; this angle is generally referred as "the target angle." This dial also carries a movable pointer 9 which is set to the estimated speed of the target in a manner which will be hereinafter described.

The vector diagrams shown in Figs. 1^A and 1^B, illustrate the problem shown upon the dials disclosed in Fig. 1 of the drawing. From these diagrams it will be clear that the vector EF' represents the course and speed of own ship and the vector BD, the course and speed of the target. The vector EF' illustrates that the true course of own ship is 330°, that the true target bearing or line of fire is 120° and that the relative target bearing, i. e., the angle between the keel of own ship and the line of fire is 150°. It is also clear from the vector BD that the true course of the target is 260° and that the target angle, i. e., the angle which the target makes with the line of fire is 40°. The course of the target with respect to own ship is not indicated directly upon the diagram but it will be clear that since the angle between own ship and the line of fire is 150° and the angle between the line of fire and the target is 140°, the course of the target relative to own ship will be the sum of these two or 290°. It will be noted that the vector EF' shown in Fig. 1^A is laid out along the course of own ship whereas in Fig. 1 of the drawing, the vector EF is laid out along the line of fire, and in each instance, the length of the vector corresponds to the speed of own ship.

Referring now to Fig. 1^B of the drawing, the vector EF is shown laid out along the line of fire and resolved into its components parallel and at right angles to own ship's course, and the vector EF' is laid out along own ship's course and resolved into its components parallel and perpendicular to the line of fire. From this figure it is clear that two equal triangles are thus produced and the component EG=EG' and the component FG=F'G'. It is evident that the component EG' is the range rate component and therefore, the component EG may be utilized if desired and in the same manner the component F'G' is the deflection component and the component FG may be used in place thereof. This vector will be further referred to in the description of the instrument.

A small dial 10 which will be referred to as "own ship dial" is utilized in combination with the target dial 6 to indicate the position of own ship with respect to the target, each of the dials, 6 and 10, carrying a figure or representation of a ship for this purpose.

Figure 2:
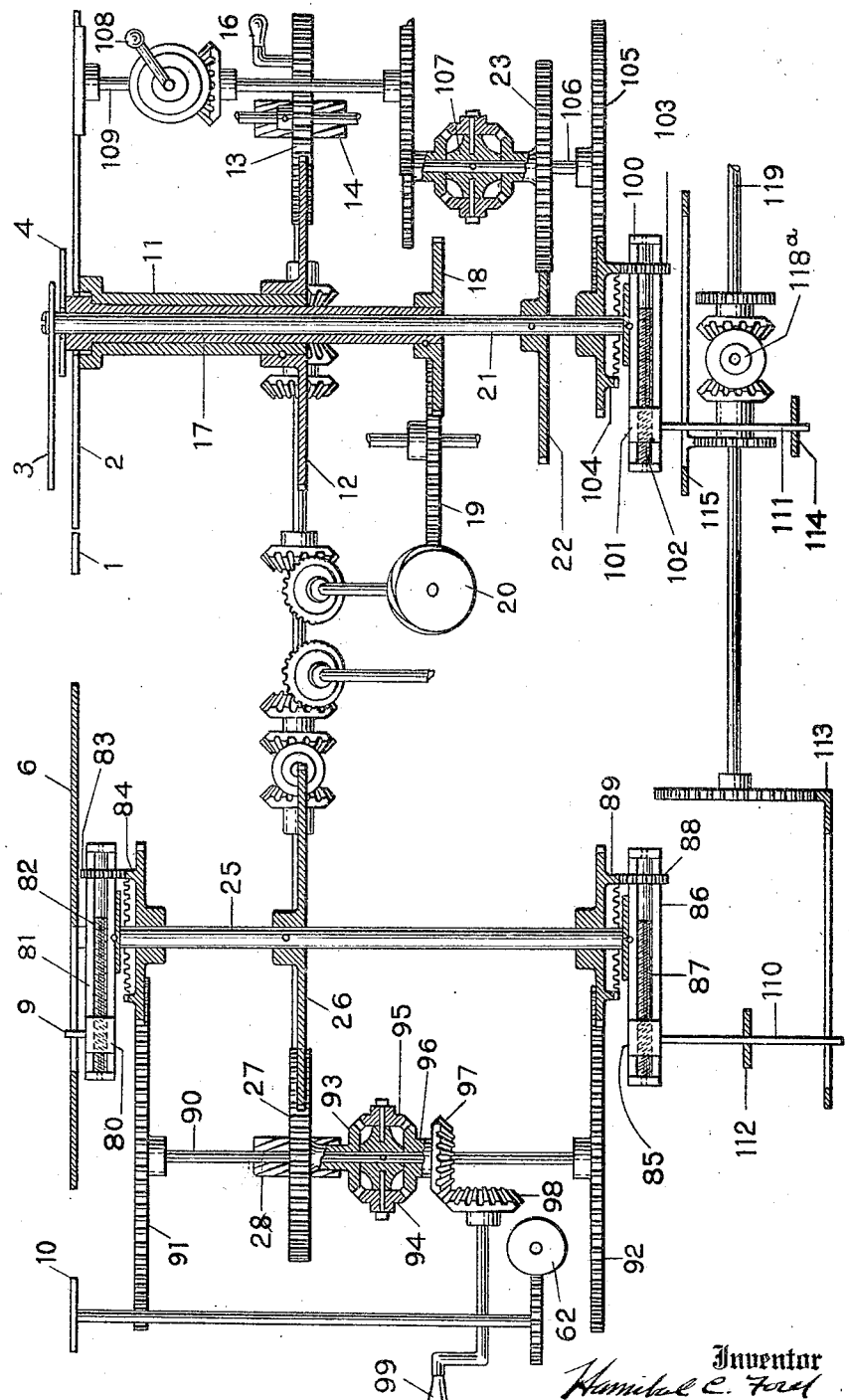
Figure 2 is a section on the line A—A of Fig. 1.

Referring now to Figure 2, the relative bearing dial 1 is fastened permanently in the instrument by a construction not shown. The compass dial 2 is mounted upon a sleeve 11, which carries a gear 12 which is shown in dotted lines on Figure 1. This gear meshes with a gear 13 which may be actuated by a spiral gear 14 carried by a shaft 15. A handle 16 is shown attached to this shaft for rotating the gear 14 but it is to be understood that if desired, this shaft 15 may be connected to the repeater of a gyro-compass as is well understood in the art. The target course pointer 4 is mounted upon a sleeve 17 within the sleeve 11 which sleeve carries a gear 18 which is actuated by gears 19 and 20.

The target bearing pointer 3 is mounted upon a shaft 21 which carries a gear 22 which is actuated by gears 23 and 24 (see Figure 1). The target dial 6 is carried by a shaft 25 and is actuated by a gear 26 which meshes with gears 27 and 28.

Referring now to the interconnection between these dials and pointers whereby they will, when actuated, continue to correctly give true and relative courses and bearings, the system of connection between the gears 14, 20, 24 and 28 is disclosed in Figure 1 and it is believed that the construction will be clear from a description of the operation of the shafts and differentials shown in this view.

To set the course of own ship, the handle 16 is actuated, which will through the gears 14, 13 and 12, actuate the compass dial. The rotation of the shaft 15 actuates the differential consisting of gears 30, 31, 32 and 33, shaft 15 being connected to the gear 30 and the gears 31 and 32 being connected to a spider fastened to shaft 34. The gear 33 is held stationary by the connection to a target course setting crank 35 which is stationary unless it is positively actuated. The shaft 34 connected to the center of the differential, will therefore turn and through bevel gears 36 and 37 will actuate the gears 20, 19 and 18 to turn the target course pointer 4. Inasmuch as the center of the differential will only rotate shaft 34 at half the speed of the shaft 15, the gears 18 and 12 should be in a two to one ratio. The target course pointer will therefore, when the compass dial 2 is turned, turn with it and the relative positions of the dial and pointer will not be varied; or in other words, the pointer will continue to read the true course of the target off the compass dial, even though the course of own ship may be varied. The relative course of the target with respect to own ship will however, be varied and may be read off the scale of the dial 1 opposite the end of target course pointer 4.

Referring now to the movement of the target bearing pointer 3, when the course of own ship is changed; the shaft 15 carries a gear 40 which meshes with a gear 41 upon a counter-shaft 42 which shaft also carries a gear 43 which meshes with a gear 44 which is connected to a gear 45 forming a part of a differential, the other gears of which are 46, 47 and 48. The gears 46 and 47 constitute the center of a differential and are connected to a spider which is fastened to a shaft 49. When the shaft 15 is therefore rotated the center shaft 49 being held stationary, as will be later described, the gear 48 will be rotated at the same speed as gear 45 but in the opposite direction and will actuate bevel gear 50 through gears 51 and 52. The gear 50 is connected to the gear 24 through gears 53 and 54, shaft 55, gears 56 and 57 and shaft 58, so that the target bearing pointer 3 will also be rotated with the compass dial 2 and the gear ratios are such that this pointer will be rotated at the same speed as the compass dial, so that their relative positions will not be changed. The pointer 3 will therefore continue to indicate the true target bearing upon the compass dial 2 and the relative target bearing with respect to own ship upon the dial 1 which will, of course, vary when the course of the ship is changed.

The rotation of the shaft 58 will, through gears 60 and 61, actuate a gear 62 which drives own ship dial 10 so that the angular displacement of this dial will correspond with the change in the course of own ship.

As is evident, the change in the course of own ship should not affect the angle which the target makes with the target bearing or the line of fire and therefore the target dial 6 should remain stationary when the compass dial is rotated. This is accomplished by the differential gearing between the dials and pointers as will now be described. The gear 53 is connected to a gear 63 forming part of a differential consisting of gears 64, 65 and 66, the gears 64 and 65 being carried by a spider fastened to the shaft 34; the gear 63 is loose upon this shaft and the gear 66 is fastened to a shaft 67 which actuates the gear 28, driving the target dial. As has already been stated, the rotation of the shaft 15 drives the shaft 34 at half its speed. The shaft 34 therefore drives the center of the differential consisting of gears 64 and 65 at half the speed of the shaft 15. As has also been stated, the gear 48 is also driven from the shaft 15 through shaft 42, etc. at the same speed as is the shaft 15, but in the opposite direction, which will drive the gear 63 of the differential in the same direction as the shaft 34. The gear 66 of the differential will therefore remain stationary and the target dial 6 will not be actuated.

To set the target course, the target course crank 35 is actuated, which will, since the gear 30 is held stationary due to its connection with the crank 16, rotate the center of the differential consisting of gears 31 and 32 and through the shaft 34 and gears 36 and 37, drive the target course pointer 4. Since gear 30 is stationary, the compass dial will not be rotated as is required, since the change in the target course could not affect the course of own ship, the target bearing pointer 3 will also not be actuated because the gear 48 of the differential consisting of gears 45 etc. is held stationary by the shafts 42 and 49. The rotation of the shaft 34 will also turn the center of the differential (gears 64 and 65) but will not affect the gear 53 which is loose upon the shaft 34 and hence the shaft 55 will remain stationary and the target bearing pointer will not be affected. This is also true of own ship dial 10 which is also actuated by the shaft 58. The target dial 6 however, should be rotated an amount corresponding to the angular displacement of the target course pointer 4 which is accomplished, since the rotation of the shaft 34 will, through the gears 64, 65 and 66 of the differential, drive the shaft 67 at twice the speed of the shaft 34, but due to the two to one reduction of the gears 27 and 26, the target dial will be rotated at the same speed.

To set the target bearing pointer 3 by hand, the crank 70 is utilized, which is mounted on shaft 49$^a$. The shaft 49 is normally connected through gears 71, 72, and 73 with shaft 74. When the crank 70 is pressed inwardly to its dotted line position (shown in Fig. 1), this will disconnect the gear 72 from the gear 73 by pushing the gear 72 to its dotted line position. The gear 72 is pushed inwardly by a gear 74', which is fixed to the shaft 49$^a$ and has a flange 75 which presses against the gear 72 when these parts are in their dotted line position. The rotation of the shaft 49$^a$ through crank 70, therefore, rotates the shaft 49 and the center of the differential consisting of gears 46 and 47 and since the gear 45 is held stationary by its connection to the crank 16, the gear 48 will be rotated and through the gears 51, 52, 50, 53 and 54, etc., drive the target bearing pointer 3 and also own ship dial 10, a corresponding amount. This is necessary in order to have the two dials 6 and 10 represent the relative positions of own ship and target relative to the line of fire which is a fixed line in the instrument, designated by the dot and dash line A—A. It may here be stated that line A—A has three characteristics, 1st, it is the center line upon which the section shown in Fig. 2 is taken; 2nd, the upper half of this line, namely, the half which cuts the own ship dial 1, compass dial 2 and associated parts, corresponds to the fore and aft line of own ship, the lower half of this line, namely that portion which cuts the target dial 6 and own ship dial 10, corresponds to the line of sight of fire between the two ships, or in other words, upon the upper half of the instrument, the line of sight is angularly displaced as shown by the pointer 3 and the course of own ship is fixed, while in the lower half of the instrument, the line of sight between the two instruments is fixed and course of own ship is angularly displaced as shown by own ship dial 10. A spring 50ª pressing against the handle 70 and a fixed abutment 51ª returns the crank 70 to its normal position when released which will permit the gear 72 to again mesh with gear 73 under the action of a spring 52ª. The target dial 6 is also actuated because the shaft 34 is held stationary by its connection to the crank 35 and the gear 63 will therefore, since the center of the differential consisting of 64 and 65 is stationary, rotate the shaft 67 to change the position of the target dial.

Summing up the description of the arrangement of dials and pointers, it is evident that the rotation of the compass dial drives all the pointers and dials with exception of the target dial 6, an amount corresponding to the amount which the compass dial is turned; the setting of the target course pointer 4 by crank 35 actuates only the target course pointer 4 and the target dial 6; and the actuation of the target bearing pointer 3 causes a corresponding rotation of own ship dial 10 and target dial 6, while target course pointer 4 and compass dial 2 remain stationary.

As before stated, the target dial 6 carries a speed scale 8 with which a movable pointer 9 co-operates. The pointer 9 is carried by a sliding block 80 and the construction whereby this block may be displaced for different speeds will now be described. The block rides in slide or guide-ways in a frame 81 carried by the shaft 25. The block 80 is threaded on a screw-shaft 82 which is journalled in the frame. At one end the screw-shaft 82 carries a gear 83 which meshes with a crown gear 84 mounted loosely upon the shaft 25 whereby relative rotation of the gear 84 and shaft 25 will rotate the gear 83 and hence displace the sliding block 80 which carries the pointer 9. A sliding block 85 of similar construction is mounted upon a screw-shaft 87 in a guide frame 86. The screw-shaft 87 is rotated by a gear 88 which meshes with crown gear 89, also loosely mounted upon the shaft 25. Mounted at the ends of a shaft 90 (Fig. 2) are two gears 91 and 92 which mesh with spur gears carried by the crown gears 84 and 89 respectively. The shaft 90 carries a differential consisting of gears 93, 94, 95 and 96. The gears 94 and 95 form the center of the differential and are carried by a spider fastened to the shaft 90. The gear 93 is connected to the gear 27 which is loose on the shaft 90 and rotates the shaft 25 through gear 26. The gear 96 is connected to a bevel gear 97 which meshes with a gear 98 which is rotated by a crank 99 which is utilized for setting up or changing the speed of the target. The operation of this portion of this device is as follows:—

When the gear 27 is being actuated to rotate the shaft 25, the gears 93, 94 and 95 of the differential will rotate the center of the differential and the shaft 90 at one-half the speed of the gear 93, since the gear 96 is held fixed by its connection to the crank 99. The gears 91 and 92 will then drive gears 84 and 89 at the same speed as the shaft 25 and the gears 83 and 88 will therefore not be rotated. When it is desired to set up a different target's speed as will be indicated by the pointer 9, the crank 99 is turned. The rotation of the gear 96 will then drive the center of the differential or gears 94 and 95 to cause a rotation of the shaft 90 and will therefore through the connections to the gears 83 and 88, positively drive these gears to displace the blocks until they are moved to their proper position, corresponding to the speed of the target which will be indicated by the pointer 9. The importance of this construction is that the target's speed can thereby be changed while the gear 27 is being actuated and furthermore it makes it unnecessary to disconnect the crank 99.

As will be clear from Fig. 2, the shaft 21 which carries the target bearing pointer, also carries a guide frame 100 in which a travelling block 101 slides, which block is threaded upon a screw-shaft 102 driven by a gear 103 and is similar to the construction of the displaceable block 85. The gear 103 is driven by a crown gear 104 which is actuated by a gear 105 upon a shaft 106. The shaft 106 carries a differential 107, one side of which is driven by a crank 108 which through bevel gears is connected to the shaft 109 carrying the speed dial 5 for own ship. The gear 23 which is actuated by the gear 24 (not shown in Fig. 2) is directly connected to the differential 107 and under normal operation the rotation of the shaft 21 will not displace the block 101 which is displaced by turning the crank 108 to a position coresponding to the speed indicated by the dial 5, the construction being in all respects similar to the differential connection to the displaceable blocks 80 and 85 which has been described.

As will be clear from Fig. 1, the block 80 is arranged so that it is always parallel to the diametral line which passes through the zero indication of this dial and the distance from the center of the dial to the center of the block is the mechanical vector representing the target's course and speed which is shown by the dot and dash line B—D. This mechanical vector has therefore a direction with respect to the line A—A representing the line of sight corresponding to the target angle with respect to the line of sight and a length which is proportional to the speed of the target. As has been described, the target bearing with respect to the target dial 6, is represented by a fixed line A—A. The mechanical vector B—D is resolved into its componets along the line A—A and at right angles thereto, which components are represented by the distances B—C and C—D respectively. The component B—C is proportional to the change of range rate due to the target, and the component C—D is proportional to the deflection, due to the target, as is well known.

Referring now to the sliding block 101, it will be clear from Figure 1 that this block is arranged directly beneath the target bearing pointer 3 and therefore the mechanical vector represented by the line E—F lies upon the target bearing or line of fire and is changed when the target bearing changes. If, however, this mechanical vector is resolved into its components along a fixed line parallel to the fore and aft line of the ship which is the course of the ship and is shown by the line E—G (shown in Figure 1) the component E—G will be proportional to the range rate due to the movement of own ship and the component F—G will be proportional to the deflection, due to the movement of own ship. This is true, because if a vector representing the speed and course of own ship is resolved into its components along the target bearing line and at right angles thereto, and if a vector is laid out upon the target line having a length proportional to the speed of own ship and is resolved into its components along the course of own ship and at right angles thereto, it will be found that two equal triangles are thus derived and hence the sides of the two triangles must be equal, which sides correspond to the components of the range rate and deflection respectively, as will be clear from the diagram shown in Fig. 1ᴮ already referred to.

Referring again to Figure 2 it will be seen that the blocks 85 and 101 which define the mechanical vectors, to be resolved into components, as just described, carry pins 110 and 111 respectively. These pins are more clearly shown upon Figure 3 of the drawing from where it will be seen that they co-operate with slides for resolving the vectors into their components. The pin 110 controls the movement of slides 112 and 113 and the pin 111 controls the movement of the slides 114 and 115; the slides 112 and 114 carry racks, which actuate a differential 115' whereby the displacement of these slides is either added or subtracted, depending upon whether the displacement is in opposite or the same direction, to give the total range rate due to the movement of own ship and target. The differential 115' drives through bevel gears 116 and 117, the shaft 118 which has therefor an angular displacement which is proportional to the range rate. In the same way, the displacement of the slides 113 and 115 are added or subtracted by a differential 118ᵃ to cause an angular displacement of a shaft 119 proportional to the deflection due to both the movement of the ship and target. This arrangement of slides and differentials has been clearly disclosed in greater detail in my application for patent on a range keeper filed December 4th, 1917, and having Serial No. 205,357. The shafts 118 and 119 may be utilized if desired, to drive indicating mechanism for giving direct readings of the range rate and deflection. As is also disclosed in that application, the angular displacement of the shaft 118 in accordance with the range rate is utilized to generate the range. This construction is shown on Figure 4 of the drawing where the shaft 118 actuates a gear 119' which translates a rack 120 carried by the cage 121 of a variable speed device. This variable speed device comprises a disc 122 to which is attached a gear 123 which is driven by a gear 124 by shafts 125 and 126. The shaft 126 is adapted to be connected to a constant speed motor which may be either an electrical or spring motor. The disc 122 constitutes the driving element of the transmission and the driven element comprises a roller 127 which is mounted in a yoke having arms 128, which yoke is pivoted to one of the guides for the cage. An arm 129 carried by the yoke has attached to it a spring 130 which exerts a tension upon the roller in a direction to press it towards the disc and exert a pressure upon two balls which are interposed between the disc and roller, one of which is shown and is designated 131. The two balls are in alignment and constitute the driving connection between the disc and the roller, as will be clear from the variable speed transmission shown in the upper part of the drawing which is of the same construction. By utilizing two of the balls between the disc and roller, a variable speed is produced which is admirably adapted for use as an integrator and in the present construction, since the balls are displaced from the center of the disc, proportionately to the range rate, the driven roller 127 will drive the range counter or other indicating mechanism at the proper speed to have the indicator continuously indicate the proper range if the initial range has been properly set up thereupon. As is obvious, the balls are moved to one side of the center of the disc for an increasing range rate and to the other side of the disc for decreasing range rate which will drive the roller 127 in opposite directions as is required. A range counter as is shown 132 may be utilized to indicate the range. This counter is connected to the roller 127 by a shaft 133 which has a universal coupling, with the roller 127 at 134 to permit a slight movement of the roller 127. A crank 134′ is utilized to set up the proper initial range or any corrections such as spots, which will be indicated by the range counter 132. Before doing this, however, the button 137 should be pressed downwardly to lift the roller 127 out of contact with the balls so that the roller will turn freely without communicating its rotation to the disc 122 which is permanently connected to the constant speed motor.

As is known in the art, the deflection due to two relatively moving objects is equal to $RdB$ in which R represents the range between the objects and $dB$ represents the rate of change of bearing. It is therefore evident that in order to generate the bearing it is necessary to either multiply the factor $RdB$ by the reciprocal of the range or $\frac{1}{R}$ or to divide the factor $RdB$ by the range, or R and then integrate the rate of change of bearing which is thus obtained. In the present construction the quotient of the factors $\frac{RdB}{R}$ is obtained by the following construction. The shaft 119 whose angular displacement is proportional to the deflection, actuates through a gear 140 a sector 141, so that the angular displacement of this sector is also proportional to the deflection. A second sector 142 is connected to this sector by links 143 and 144, the links 144 and a portion of the sector 141, as well as link 143, forming a parallel linkage. The link 143 is provided with a slot 144ᵃ in which is slidably mounted a pin 145. The pin 145 is carried by a travelling nut or block 146 which slides in a slot 147, in the sector 142. The block 146 is carried upon screw-shaft 149 which is rotated by the shaft 136′; the shafts 136′ and 149 being connected at 150 by a universal joint to permit the sector 142 to swing and yet be permanently connected to the range rate integrator and crank for setting the range. It will therefore be seen that since the pitch of the screw-shaft 149 is uniform, the pin 145 will have a displacement which is directly proportional to the range. When the range is a minimum the block 146 occupies its lowermost position in the slot 147 and when the range is a maximum the block occupies its uppermost position in this slot.

It will therefore be evident that the displacement of the sector 142, through its connection to the pin 145, decreases proportionately to increases in range or in other words, the displacement of the sector 142 is proportional to the quotient of the displacement of sector 141 divided by the displacement of the pin 145 from the bottom of its slot and hence is proportional to $\frac{RdB}{R}$ which equals $dB$, or the rate of change of bearing. The sector 142 may therefore be utilized to generate the bearing in conjunction with a bearing integrator. This integrator is of a similar construction to the range rate integrator and consists of a disc 150′ which is connected by a shaft 151 to the shaft 126 of the constant speed motor. The driven element of the integrator comprises a roller 152 which is driven at varying speeds by two balls 153 and 154 interposed between the roller and disc. These balls are surrounded by a cage or frame which carries a rack 155 which rack is translated by a pinion 156 connected by bevel gears 157 and 158 to the pinion 159 which meshes with the teeth of the sector 142. The displacement of the balls 153 and 154 from the center of the disc is therefore proportional to the rate of change of bearing and since the disc 150′ is driven at a constant speed, the roller 152 will have a displacement which is proportional to the change in bearing and may therefore be utilized to drive shaft 74. The shaft 74 disclosed in Figure 4 is a continuation of the shaft 74 disclosed in Figure 1 which drives through the idler gear 72, the shaft 49 which actuates the target bearing pointer 3, as has been described. It will therefore be evident that after the initial bearing has been set up upon the instrument by crank 70 the displacement of the shaft 74 will therefore continue to automatically change the target bearing in accordance with the conditions of course and speed of own course and target set up in the instrument.

The operation of the device will be evident from the preceding description. The course of own ship is either automatically carried into the instrument by a repeater compass or is manually set by the handle 16. The speed of the ship is set up upon the dial 5 which as described, will determine the length of the mechanical vector defining the course and speed of own ship. The target course and speed is estimated and is set up by actuating the crank 35 to move the pointer 4 to indicate the estimated target course, the speed being set up upon the scale 8 upon the target dial 6 by the crank 99. The initial range is set up in the instrument by crank 134′ and the initial target bearing by the crank 70.

Assuming that the instrument is operating, that is, the constant speed motor is properly synchronized, the resolution of the components of the vectors into the range rate and deflection of the components by means of the slides, will in turn, actuate the range rate and rate of change of bearing integrators to automatically drive the shafts 133 and 74. The present range will be therefore continuously indicated upon the counter 132 and the bearing by the target bearing pointer 3. Since the shaft 74 is driven by the bearing integrator, the driving of the target bearing pointer 3 will in turn, affect the position of the slides to vary the speeds of the range rate and rate of change of bearing integrators to thereby vary the rate of displacement of the target bearing pointer 3 and the range in accordance with the conditions which have been set up upon the instrument.

It will therefore be seen that the instrument described provides a simple and positive means for continuously integrating the range which exists between two moving objects as well as the bearing of one of these objects with respect to the other, and while in general the embodiment of the invention disclosed is particularly adapted for use upon ships, it is evident that it is not limited to this particular use, but may be utilized with slight modifications where one of the moving objects is stationary and the other is moving relatively to it. For such use it is only necessary to move one of the blocks, either the one representing the target or own ship, to a point where it is concentric with its axis of rotation, that is, to a position where the vector represents a zero speed. The displacement of the slides will then be proportional to the displacement of the one moving object alone and the bearing of this moving object with respect to a fixed object, may be determined by the instrument in the manner described.

One of the uses to which such instrument may be placed is in coast defense work, where it is desired to maintain the range and bearing of an enemy ship from a fixed line. Other uses will be apparent to one skilled in the art and it may be here stated that in case only one object is movable and the other object is fixed, the necessity of one of the mechanical vectors ceases and this vector as well as the slides and differentials connected therewith, may be dispensed with and the slides of the other mechanical vector may be connected directly to the range rate integrator and to the bearing integrator through the sectors 141 and 142 as described. It is intended, therefore that such modification will come within the scope of this invention, as well as all other modifications which are within the scope of the claims appended hereto.

I claim:

1. In an instrument of the class described, indicating mechanism having a movable element for indicating the course of one moving object, other indicating mechanism having a movable element for indicating the direction of a second movable object with respect to the line of sight between the objects, means for shifting the movable element of said first named indicating mechanism and for simultaneously shifting the movable element of said second named mechanism when the course of the first object changes and means for shifting the movable element of the second named mechanism independently of the element of said first named mechanism when the course of the second object changes.

2. In an instrument of the class described, a rotary compass dial for indicating the course of a moving object, a rotary target course pointer associated with said compass dial for indicating on said dial the course of the target, means for setting said compass dial and for simultaneously shifting said target course pointer and means for setting said pointer independently of said compass dial.

3. In an instrument of the class described, a fixed dial, a rotary compass dial co-operating with said fixed dial for indicating the course of one moving object, a rotary pointer associated with said compass dial for indicating the course of a second movable object and means between said compass dial and pointer for simultaneously moving said dial and pointer together and for moving said pointer independently of said compass dial.

4. In an instrument of the class described, a fixed ring dial, a compass dial within said fixed dial, a rotary target course pointer co-operating with said compass dial and differential gearing for shifting said dial and pointer together or for independently shifting said target course pointer.

5. In an instrument of the class described, mechanisms having movable elements for indicating the true courses of each of two moving objects and the relative course of one with respect to the other, and means including differential gearing connecting said movable elements for shifting them to continue to indicate the true courses of both objects and the relative course of one with respect to the other when the course of one object is changed.

6. In an instrument of the class described, mechanism having a movable element for indicating the true course of a moving object, mechanism having a movable element for indicating the true course of a second moving object and connections between the movable elements for shifting them to thereby indicate the true course of both objects when the course of one object is changed.

7. In an instrument of the class described, mechanism for indicating the true course of a moving object, mechanism for indicating the true course of a second moving object and its relative course with respect to said first moving object and differential gearing connecting said indicating mechanisms, whereby upon changing the course of either object the indicating mechanisms will continue to correctly give the true course of the first object and the true and relative courses of the second object.

8. In an instrument of the class described, mechanism for indicating the course of a moving object, mechanism for indicating the course of a second moving object, mechanism for indicating the direction of the line of sight between said objects and differential gearing connecting said mechanisms.

9. In an instrument of the class described, mechanism for indicating the course of a moving object, mechanism for indicating the true course of a second moving object and its relative course with respect to said first moving object, mechanism for indicating the true and relative bearing of the line of sight between said objects and differential gearing connecting said mechanisms for correspondingly shifting one of said mechanisms when another of said mechanisms is shifted.

10. In an instrument of the class described, a compass dial for indicating the course of a moving object, a pointer associated with said dial for indicating the direction of the line of sight between the moving object and a target and means connecting said compass dial and said pointer for shifting the dial and pointer together and for shifting the pointer independently of the dial.

11. In an instrument of the class described, a compass dial for indicating the course of a moving object, a pointer associated with said dial for indicating thereon the course of a second moving object, a second pointer associated with said dial for indicating thereon the direction of the line of sight between said moving objects and means connecting said dial and said pointers for shifting them when the course of either object and the line of sight between them change.

12. In an instrument of the class described, a compass dial for indicating the course of a moving object, a pointer associated with said compass dial for indicating the course of a second moving object, a second pointer associated with said dial for indicating thereon the direction of the line of sight between said moving objects, means for shifting said compass dial and for correspondingly shifting both of said pointers, means for shifting one of said pointers independently of said compass dial and the other of said pointers and means for shifting the second of said pointers independently of said dial and the other pointer.

13. In an instrument of the class described, a compass dial for indicating the course of a moving object, a pointer associated with said compass dial for indicating the course of a second moving object, a second pointer associated with said dial for indicating thereon the direction of the line of sight between said moving objects, means for shifting said compass dial and for correspondingly shifting both of said pointers, means for shifting one of said pointers independently of said compass dial and the other said pointer, means for shifting the second of said pointers independently of said dial and said other pointer, and a scale co-operating with said dial and pointers for indicating the relative bearing of a second moving object with respect to the first moving object and the relative bearing of the line of sight with respect to said first named moving object.

14. In an instrument of the class described, indicating mechanism for indicating the course of a moving object, other indicating mechanism for indicating the angle which a target makes with the line of sight between the object and target and means including differential gearing for simultaneously shifting each of said indicating mechanisms and for shifting the target indicator mechanism independently of the course indicator mechanism.

15. In an instrument of the class described, a compass dial for indicating the true course of a moving object, a pointer co-operating with said compass dial for indicating the true course of a second moving object, a second pointer co-operating with said dial for indicating the true bearing of the line of sight between said objects, other indicating mechanism for indicating the angle which the course of one moving object makes with the line of sight between said objects and differential gearing connecting said dials, pointers and indicating mechanism.

16. In an instrument of the class described, a mechanism for indicating the true and relative courses of a moving object and a moving target, and differential gearing connecting said indicating mechanism for shifting them together and independently of each other.

17. In an instrument of the class described, a mechanical vector having a direction corresponding to the course of a moving object and a length corresponding to the speed of said object, members for resolving said vector into its components along the line of sight between said object and a second moving object and at right angles thereto, a second mechanical vector having a direction parallel to the line of sight between said objects and a length corresponding to the speed of said second object and members for resolving said vector into its components along the course of said second moving object and at right angles thereto.

18. In an instrument of the class described, a mechanical vector having a direction corresponding to the line of sight between two moving objects and a length corresponding to the speed of one of said objects and members actuated by said vector for resolving it into its components along a line parallel to the course of one of said moving objects and at right angles thereto.

19. In an instrument of the class described, a mechanical vector having a direction parallel to the line of sight between two moving objects and a length corresponding to the speed of one of said moving objects, a pair of slides actuated by said vector, one of said slides being parallel to the course of one of said moving objects and the other at right angles to said course for resolving said vector into its components of range rate and deflection.

20. In an instrument of the class described, a mechanical vector having a direction parallel to the line of sight between two moving objects and a length corresponding to the speed of one of said objects, a pair of slides associated with said vector for resolving it mechanically into its components parallel to the path of movement of one of said moving objects and at right angles to said path, a second mechanical vector having a direction corresponding to the course of the second moving object and a length corresponding to the speed of said object and a pair of slides actuated by said last named vector for resolving it into its components along the line of sight and at right angles thereto, and means for adding the components of range rate and deflection of both moving objects.

21. In an instrument of the class described, two separate mechanical vectors representing two moving objects and means connecting said vectors for shifting both of said vectors when the direction of one object is changed and for shifting one of said vectors independently of the other when the direction of the other object is changed.

22. In an instrument of the class described, two separate mechanical vectors representing two moving objects and differential gearing connecting said vectors for shifting both of said vectors when the direction of one object is changed and for shifting one of said vectors independently of the other when the direction of the other object is changed.

23. In an instrument of the class described, two separate mechanical vectors, members for resolving each of said vectors into components at right angles to each other, differential gearing connecting said vectors and means for adding corresponding components of the vectors together.

24. In an instrument of the class described, two mechanical vectors, members for resolving each of said vectors into components at right angles to each other, means for adding corresponding components together and means for connecting said vectors for simultaneously changing both vectors or for changing one of said vectors independently of the other.

25. In an instrument of the class described, a rotary shaft, means for driving the shaft, a mechanical vector carried by the rotary shaft, means for adjusting the length of the vector, and means associated with the driving means whereby the adjusting means may be selectively rendered effective or ineffective during the rotation of the shaft.

26. In an instrument of the class described, a shaft, a mechanical vector carried by the shaft, a member mounted freely on the shaft, a second member associated with the vector and cooperating with the first member, and means for driving the first member at the same speed as the shaft to prevent actuation of the member associated with the vector when the shaft is rotated.

27. In an instrument of the class described, a rotary frame, a screw-shaft carried by said frame, a travelling nut on said screw-shaft, a gear on said screw-shaft, a gear meshing with said screw-shaft and differential gear connected to said last named gear and said rotary frame having a manually operative part.

28. In an instrument of the class described, a shaft, a frame mounted on the shaft, a member slidably mounted in the frame, and means comprising a part mounted on the shaft for displacing the member upon rotary movement of said part relative to the shaft.

29. In an instrument of the class described, a rotary frame, a slide block in the frame, a screw shaft for displacing the block having an operating gear thereon, a part engaging the gear for rotating it to displace the block upon relative movement between the part and the frame, means for rotating the frame and means connected to said rotating means for moving the part in unison with the frame to prevent it from displacing the block.

30. In an instrument of the class described, a member having a displacement proportional to the deflection between two objects, one of which at least is moving, a member having a displacement directly proportional to the range between the two objects and a linkage mechanism connected to said members having a part whose displacement is proportional to the quotient of the displacement of said first named member divided by the displacement of said second named member, and a variable speed mechanism having its speed varying element connected to said part.

31. In an instrument of the class described, a swinging member having an angular displacement proportional to the deflection between two objects one of which at least is moving, a second swinging member, a sliding part carried by one of said members having a displacement proportional to the range, and a linkage connecting said members having a sliding engagement with said part.

32. In an instrument of the class described, a swinging member having an angular displacement proportional to the deflection between two objects, one of which at least is moving, a second swinging member, a sliding part carried by one of said members, means for displacing said part proportionally to the range, and a parallel linkage connected to one of said members and in sliding engagement with the part carried by the other of said members.

33. In an instrument of the class described, a member having a displacement proportional to the deflection between two objects, one of which at least is moving, a member having a displacement proportional to the range, a part jointly actuated by said members having a displacement proportional to the quotient of the displacements of said members, and a variable speed device having its speed varying element connected to said part.

34. In an instrument of the class described, means for indicating the true course of a moving object, means for indicating the true course of a second moving object, means for indicating the angle which the course of the second object makes with the line of sight between the objects, and means whereby the last named means and the means for indicating the course of the second object may be shifted independently of the means for indicating the course of the first moving object.

35. In an instrument of the class described, a shaft, a mechanical vector carried by the shaft, a member mounted freely on the shaft, a second member associated with the vector and cooperating with the first member, means for driving the first member at the same speed as the shaft to prevent actuation of the member associated with the vector when the shaft is rotated, and means for altering the speed of the first member to permit actuation of the vector independently of the rotation of the shaft.

36. In an instrument of the class described, a mechanical vector having a direction corresponding to the line of sight between two objects at least one of which is moving, and a length corresponding to the speed of the moving object, and members actuated by the vector for resolving it into its components along a line parallel to a predetermined line and at right angles thereto.

37. In an instrument of the class described, a rotary compass dial, a rotary target course pointer associated with the dial for indicating thereon the course of the target, means for setting said dial and simultaneously shifting the target course pointer, and means for setting the pointer independently of the dial.

38. In an instrument of the class described, a compass dial, a pointer associated with said dial for indicating the direction of the line of sight to a target, and means connecting said dial and pointer whereby they may be shifted together or the pointer may be shifted independently of the dial.

39. In an instrument of the class described, a compass dial, a pointer associated with said dial for indicating thereon the course of a moving object, a second pointer associated with said dial for indicating thereon the direction of the line of sight to the moving object, and means connecting said compass dial and said pointers whereby they may be shifted together or the pointers may be shifted independently of the dial when either the course of the object or the line of sight changes.

40. In an instrument of the class described, a compass dial, a pointer cooperating with the dial for indicating the true course of a moving object, a second pointer cooperating with the dial for indicating the true bearing of the line of sight to the object, mechanism for indicating the angle which the course of the moving object makes with the line of sight and differential gearing connecting said dials, pointers, and indicating mechanism.

41. In an instrument of the class described, a mechanical vector having a direction parallel to the line of sight between two objects, one at least of which is moving, and a length corresponding to the speed of the moving object and a pair of slides arranged at right angles to each other and actuated by said vector for resolving the vector into components proportional to the range rate and deflection between the objects.

42. In an instrument of the class described, a mechanical vector having a direction corresponding to the line of sight between two objects, one at least of which is moving and a length corresponding to the speed of the moving object and means actuated by the vector for resolving it into components at right angles to each other and proportional to the range rate and deflection between the objects.

43. In an instrument of the class described, a compass dial, a pointer associated with the dial for indicating thereon the course of a moving object, a second pointer associated with the dial for indicating thereon the direction of the line of sight to the moving object, and means connecting said dial and pointers for shifting them when the course of the object and the line of sight change.

HANNIBAL C. FORD.